(12) United States Patent
Moghaddam et al.

(10) Patent No.: US 11,397,924 B1
(45) Date of Patent: Jul. 26, 2022

(54) DEBUGGING TOOL FOR RECOMMENDATION SYSTEMS

(71) Applicant: Microsoft Technology Licensing, LLC, Redmond, WA (US)

(72) Inventors: Samaneh Abbasi Moghaddam, Santa Clara, CA (US); Jiuling Wang, Union City, CA (US); Chih Cheng Paul Yuan, Sunnyvale, CA (US); Lachlan Green, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 791 days.

(21) Appl. No.: 16/366,990

(22) Filed: Mar. 27, 2019

(51) Int. Cl.
| | | |
|---|---|---|
| *G06Q 10/10* | (2012.01) | |
| *G06F 11/36* | (2006.01) | |
| *G06N 5/04* | (2006.01) | |
| *G06N 20/00* | (2019.01) | |

(52) U.S. Cl.
CPC ....... *G06Q 10/1053* (2013.01); *G06F 11/362* (2013.01); *G06N 5/04* (2013.01); *G06N 20/00* (2019.01)

(58) Field of Classification Search
CPC ... G06Q 10/1053; G06N 20/00; G06F 11/362
USPC .......................................................... 706/12
See application file for complete search history.

(56) References Cited

U.S. PATENT DOCUMENTS

| | | | |
|---|---|---|---|
| 10,607,189 B2 | 3/2020 | Kenthapadi et al. | |
| 10,679,187 B2 | 6/2020 | Kenthapadi et al. | |
| 11,263,563 B1 | 3/2022 | Moghaddam et al. | |
| 2009/0106221 A1 | 4/2009 | Meyerzon et al. | |
| 2010/0324970 A1 | 12/2010 | Phelon et al. | |
| 2013/0246412 A1 | 9/2013 | Shokouhi et al. | |
| 2014/0089241 A1* | 3/2014 | Hoffberg ............ | G06Q 30/0248 706/14 |
| 2015/0082277 A1* | 3/2015 | Champlin-Scharff ...................... | G06F 11/3664 717/120 |
| 2016/0034852 A1 | 2/2016 | Kapur et al. | |
| 2016/0196491 A1* | 7/2016 | Chandrasekaran .... | G06N 20/00 706/50 |
| 2016/0292288 A1 | 10/2016 | Walton et al. | |
| 2016/0350401 A1 | 12/2016 | Wang et al. | |
| 2017/0255906 A1 | 9/2017 | Le et al. | |
| 2017/0364867 A1 | 12/2017 | Potratz et al. | |
| 2018/0189292 A1 | 7/2018 | Grace et al. | |
| 2018/0197090 A1 | 7/2018 | Yates et al. | |
| 2018/0218327 A1 | 8/2018 | Kenthapadi et al. | |
| 2018/0315019 A1 | 11/2018 | Kenthapadi et al. | |

(Continued)

OTHER PUBLICATIONS

Jeffrey, Dennis, et al. "BugFix: A learning-based tool to assist developers in fixing bugs." 2009 IEEE 17th International Conference on Program Comprehension. IEEE, 2009.pp. 70-79 (Year: 2009).*

(Continued)

*Primary Examiner* — Satish Rampuria
(74) *Attorney, Agent, or Firm* — Schwegman Lundberg & Woessner, P.A.

(57) ABSTRACT

In an example embodiment, a debugging tool is provided that includes logging functionality to allow a machine learned model administrator to replay machine learned recommendation model executions in order to identify points of error, without the scaling difficulties that would be involved in logging all features used in every recommendation.

20 Claims, 14 Drawing Sheets

(56) References Cited

U.S. PATENT DOCUMENTS

| | | | |
|---|---|---|---|
| 2019/0019157 A1 | 1/2019 | Saha et al. | |
| 2019/0034792 A1 | 1/2019 | Kataria et al. | |
| 2019/0034882 A1 | 1/2019 | Saha et al. | |
| 2019/0050750 A1 | 2/2019 | Le et al. | |
| 2019/0356555 A1* | 11/2019 | Bai | H04L 41/5009 |
| 2021/0216936 A1* | 7/2021 | Kavumpurath | G06Q 10/06375 |

OTHER PUBLICATIONS

Kim, Dongsun, et al. "Where should we fix this bug? a two-phase recommendation model." IEEE transactions on software Engineering 39.11 (2013): pp. 1597-1610. (Year: 2013).*

Kulesza, Todd, et al. "Principles of explanatory debugging to personalize interactive machine learning." Proceedings of the 20th international conference on intelligent user interfaces. 2015.pp. 126-137 (Year: 2015).*

Patel, Kayur, et al. "Investigating statistical machine learning as a tool for software development." Proceedings of the SIGCHI Conference on Human Factors in Computing Systems. 2008.pp. 667-676 (Year: 2008).*

Zhang, et al., "GLMix: Generalized Linear Mixed Models for Large-Scale Response Prediction", In Proceedings of the 22nd ACM SIGKDD International Conference on Knowledge Discovery and Data Mining, Aug. 13, 2016, pp. 363-372.

"Final Office Action Issued in U.S. Appl. No. 16/366,964", dated Mar. 30, 2021, 20 Pages.

"Non Final Office Action Issued in U.S. Appl. No. 16/366,964", dated Nov. 2, 2020, 15 Pages.

"Non Final Office Action Issued in U.S. Appl. No. 16/366,964", dated Sep. 22, 2021, 19 Pages.

"Notice of Allowance Issued in U.S. Appl. No. 16/366,964", dated Dec. 6, 2021, 11 Pages.

U.S. Appl. No. 16/366,964, filed Mar. 27, 2019.

U.S. Appl. No. 16/366,977, filed Mar. 27, 2019.

"Non Final Office Action Issued in U.S. Appl. No. 16/366,977", dated May 4, 2022, 10 Pages.

* cited by examiner

| SERVER VIEW | MBEAN VIEW | TIMERS | MONITORS | RELATIONS | MLET | ABOUT |

MBEAN RANKER:NAME=JOBS FOR YOU RANKER GALENEDEBUGDESCRIPTION INFORMATION ON THE MANAGEMENT INTERFACE...

ATTRIBUTES

| NAME | DESCRIPTION | TYPE | VALUE | NEW VALUE |
|---|---|---|---|---|
| | | | | [SET ALL] |

OPERATIONS

| NAME | | RETURN TYPE | DESCRIPTION | | | |
|---|---|---|---|---|---|---|
| GETFORWARDINDEXDATA | | JAVA.LANG.STRING | GET FORWARD INDEX DATA FOR... | | | |
| PARAMETERS | | ID NAME | | | | |
| | | 0 DOCID | THE DOCUMENT ID (E.G. THE JOBID) | CLASS<br>INT | | [INVOKE] |
| GETSOURCEDATA | | JAVA.LANG.STRING | GET THE FEATURE DATA FOR A SOURCE... | | | |
| PARAMETERS | | ID NAME | | | | |
| | | 0 SOURCEID | THE SOURCE ID (E.G. THE MEMBERID) | CLASS<br>INT | | |
| | | 1 VIEWERID | VIEWER ID. OPTIONAL, DEFAULTS TO SO... | JAVA.LANG.STRING | | |
| | | 2 MODELID | MODEL ID (E.G. LIAR_JFU_9015), OPTIONA... | JAVA.LANG.STRING | | [INVOKE] |
| GETSPECIFICTARGET | | JAVA.LANG.STRING | GET EXPLANATION INFO ABOUT A... | | | |
| PARAMETERS | | ID NAME | | | | |
| | | 0 SOURCEID | THE SOURCE ID (E.G. THE MEMBERID) | CLASS<br>INT | | |
| | | 1 TARGETID | THE TARGET ID (E.G. THE JOBID) | INT | | |
| | | 2 VIEWERID | VIEWER ID. OPTIONAL, DEFAULTS TO SOU... | JAVA.LANG.STRING | | |
| | | 3 MODELID | MODEL ID (E.G. LIAR_JFU_9015), OPTIONA... | JAVA.LANG.STRING | | [INVOKE] |
| DOESDOCUMENTPASS... | | JAVA.LANG.STRING | TESTS WHETHER A GIVEN TARGET ENTI... | | | |
| PARAMETERS | | ID NAME | | | | |
| | | 0 SOURCEID | THE SOURCE ID (E.G. THE MEMBERID) | CLASS<br>INT | | |
| | | 1 TARGETID | THE TARGET ID (E.G. THE JOBID) | INT | | |
| | | 2 VIEWERID | VIEWER ID. OPTIONAL, DEFAULTS TO SO... | JAVA.LANG.STRING | | |
| | | 3 MODELID | MODEL ID (E.G. LIAR_JFU_9015), OPTIONA... | JAVA.LANG.STRING | | [INVOKE] |
| GETQUERY | | JAVA.LANG.STRING | GET THE GENERATED GALENE QUERY... | | | |
| PARAMETERS | | ID NAME | | | | |
| | | 0 SOURCEID | THE SOURCE ID (E.G. THE MEMBERID) | CLASS<br>INT | | |
| | | 1 VIEWERID | VIEWER ID. OPTIONAL, DEFAULTS TO SO... | JAVA.LANG.STRING | | |
| | | 2 MODELID | MODEL ID (E.G. LIAR_JFU_9015), OPTIONA... | JAVA.LANG.STRING | | [INVOKE] |

CONSTRUCTORS

| REPLAY | | 802 |
|---|---|---|
| MEMBER ID | 107933961 | 804 |
| START DATE | 2/15/2019 | |
| END DATE | 2/22/2019 | |
| TYPE | JOBRECOMMENDATIONS ▸ | |
| | SEARCH | |

806 → START DATE
808 → END DATE

VIEW ▸ | 🔍 | ▸ PERRECO...

TOP_K_DEBUG JSON RESPONSE ▸ JYMBII ▸ TOPKEXPLANATION ▸ PERRECO...

▾ TOP_K_DEBUG JSON RESPONSE {2}
  ▾ JYMBII {1}                                           810
    ▾ TOPKEXPLANATION {4}
      FEATURELOCATION : FEATURE_HOME
      MODEL : LIAR_JFU_1902041400
    ▾ PERRECOMMENDEDJOBVPOSTINGEXPLANATION [50]
      ▾ 0 {9}
        CANDIDATESOURCE : GALENE-CAREERSEARCH
        ▸ DOCDATA {14}
        ▸ FEATUREDEBUGDATA {0}          814
        FINALSCORE : 0.9315434999727286     818
        JOBPOSTING : URN : LI : JOBPOSTING109645041 1
        MODELSCORE : 0.8699633479118347
        ▸ PERPASSMODELSCORE [0]          820
        STATICRANK : 1666
        ▸ TRANFORMERSCORES [23]
      ▸ 1 {9}

| QUESTION | | 812 |
|---|---|---|
| TYPE | TOP K | |
| MEMBER ID | 107933961 | |
| MODEL ID | LIAR_JFU_1902041400 ▸ | |
| CHANNEL | FEATURE_HOME | |
| JOB ID | | |

REPLAY 802

MEMBER ID  107933961    804
START DATE 2/15/2019
END DATE   2/22/2019
TYPE       JOBRECOMMENDATIONS

SEARCH

QUESTION  812

TYPE     TOP K
MEMBER ID 107933961
MODEL ID  LIAR_JFU_1902041400
CHANNEL   FEATURE_HOME
JOB ID    EX. 5555555

806
808

800

VIEW ▸
TOP_K_DEBUG.JSON
RESPONSE ▸ JYMBII ▸ TOPKEXPLANATION ▸ PERRECOMMENDEDJOBPOST...
  810
  JOBEXPERIENCE : 4
▸ JOBFUNCTIONS [3]
▸ JOBINDUSTRIES [3]
  JOBLISTDATE : 1550448000
  JOBLISTTIME : 1550509869
  JOBLISTINGTYPE : P
  JOBLOCATIONDESCRIPTION : SAN FRANCISCO BAY AREA
  JOBPOSTERID : 98853674
  JOB TITLE : WE'RE HIRING DATA SCIENTISTS TO JOIN OUR...
▸ STANDARDIZEDSKILLS [50]
  0 : 10170
  1 : 55388
  2 : 8280
  3 : 12469
  4 : 17627
  5 : 13993
  6 : 55544

US 11,397,924 B1

DEBUGGING TOOL FOR RECOMMENDATION SYSTEMS

TECHNICAL FIELD

The present disclosure generally relates to technical problems encountered in the recommendation systems. More specifically, the present disclosure relates to a debugging tool for recommendation systems.

BACKGROUND

The rise of the Internet has occasioned an increase in the use of these online services to perform searches for jobs that have been posted on or linked to by the online services.

These job searches may either be performed explicitly by, for example, a user typing in a search query looking for particular jobs, or implicitly, by presenting the user with job listings the system thinks the user will be interested in. The latter may be presented in an area of a graphical user interface termed "Jobs You May Be Interested In."

In either the implicit or explicit case, results are presented based on scoring of potential results using a machine-learned model. In the case of explicit searches, the explicit search query is a large factor in the scoring of the results (which would evaluate match features such as how often terms that appear in the query appear in the results). In the case of implicit searches, match features are not used as no explicit search query is provided, but other features may be evaluated to score the results. These include global features, per-user features, and per-job features.

These features are typically extracted from training data, which may include, for example, user information such as information extracted from a user profile as well as interaction information indicating some sort of interaction by each user with one or more job postings that are also part of the training data. A graphical user interface, such as a web page, may be designed to allow for users to interact with the job postings either explicitly or implicitly, in both positive and negative ways. For example, explicit buttons may be provided in the graphical user interface for the user to save a job posting or apply to a job posting (both of which would be considered positive explicit signals, although possibly weighted differently). Another explicit button may be provided in the graphical user interface for the user to indicate that the job posting is not for them, which would be considered a negative explicit signal.

Occasionally such machine learned models produce erroneous results, however. For example, a CEO may receive an indication that a job they may be interested in is for an administrative assistant position. When such cases are reported to the model administrator, typically the model administrator would want to determine the reason the job posting was erroneously recommended (e.g., a defect in the model itself, defect in the training data, defect in the user's own data, etc.). Such debugging goals, however, are frustrated by the fact that there is often a time gap between when the erroneous recommendation was made and the model administrator is made aware of the issue, anywhere from a day or two to a week or two. During that time gap, the various inputs to the machine learned model may have changed. The job posting itself may have changed, the user's profile may have changed, or any other source for the features used by the machine learned model in predicting the recommended job posting may have changed. This makes it technologically challenging to recreate the error, which is often a necessary step in determine how the error occurred.

BRIEF DESCRIPTION OF THE DRAWINGS

Some embodiments of the technology are illustrated, by way of example and not limitation, in the figures of the accompanying drawings.

FIG. 7 is a diagram illustrating example endpoints in accordance with an example embodiment.

FIGS. 8-11 are screen captures illustrating an example debugging tool front end graphical user interface in accordance with an example embodiment.

DETAILED DESCRIPTION

Overview

In an example embodiment, a debugging tool is provided that includes logging functionality to allow a machine learned model administrator to replay machine learned recommendation model executions in order to identify points of error, without the scaling difficulties that would be involved in logging all features used in every recommendation.

DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a debugging tool is provided. This debugging tool obtains information from a logging component that logs, for each recommendation, the model used, the channel on which the recommendation was made, an identification of the user to which the recommendation was made, and a timestamp. As will be seen, this information may then be used by the debugging tool to obtain the same information as was initially submitted to the recommendation machine learned model when the recommendation was made, and thus identify the source of the error.

This document will describe the specific use case of the debugging tool in job recommendation systems that use a machine learned model to provide job recommendations to users. One of ordinary skill in the art will recognize, however, that the same techniques can be applied to other types of recommendation systems.

Figure 1:
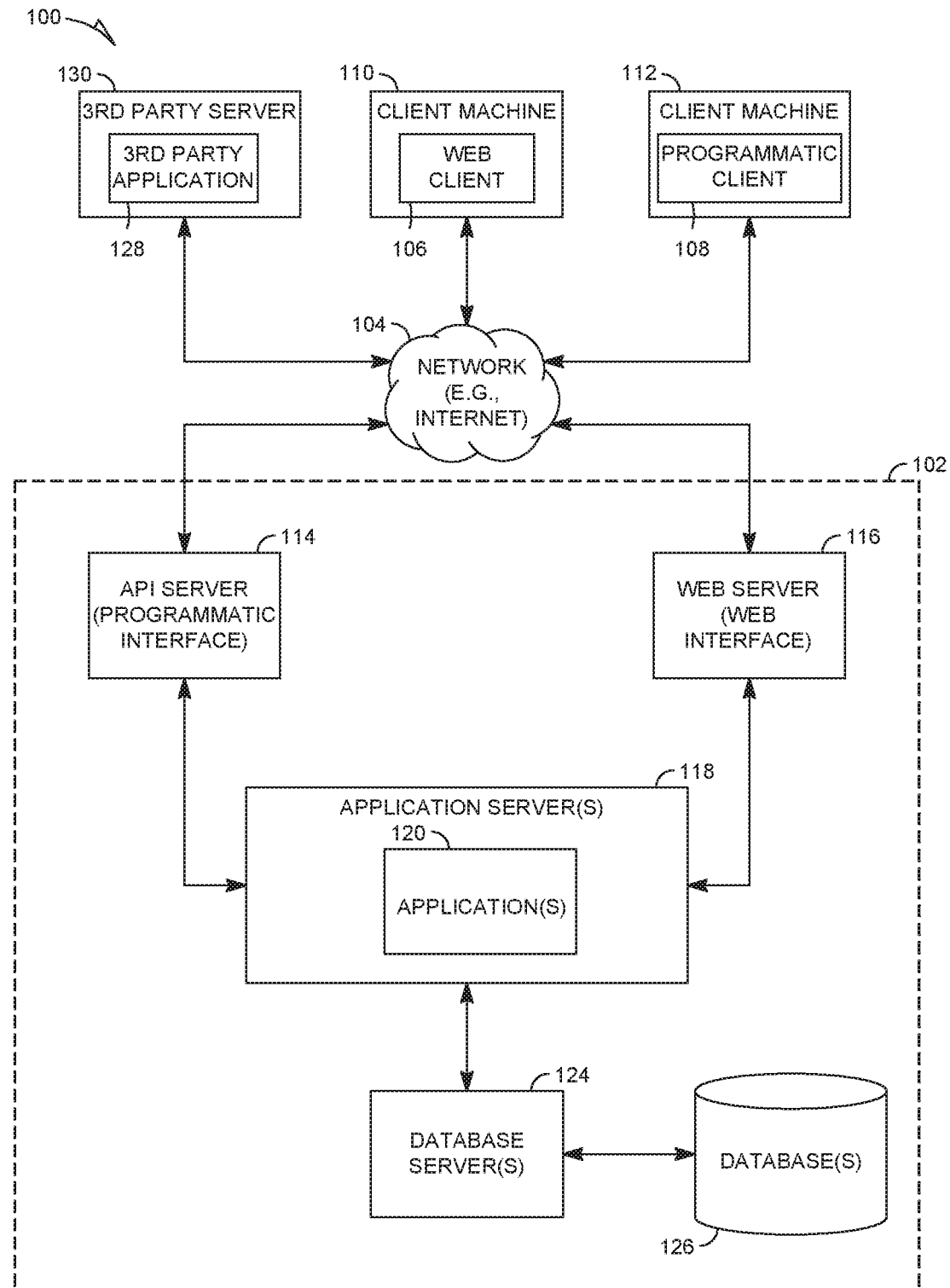
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
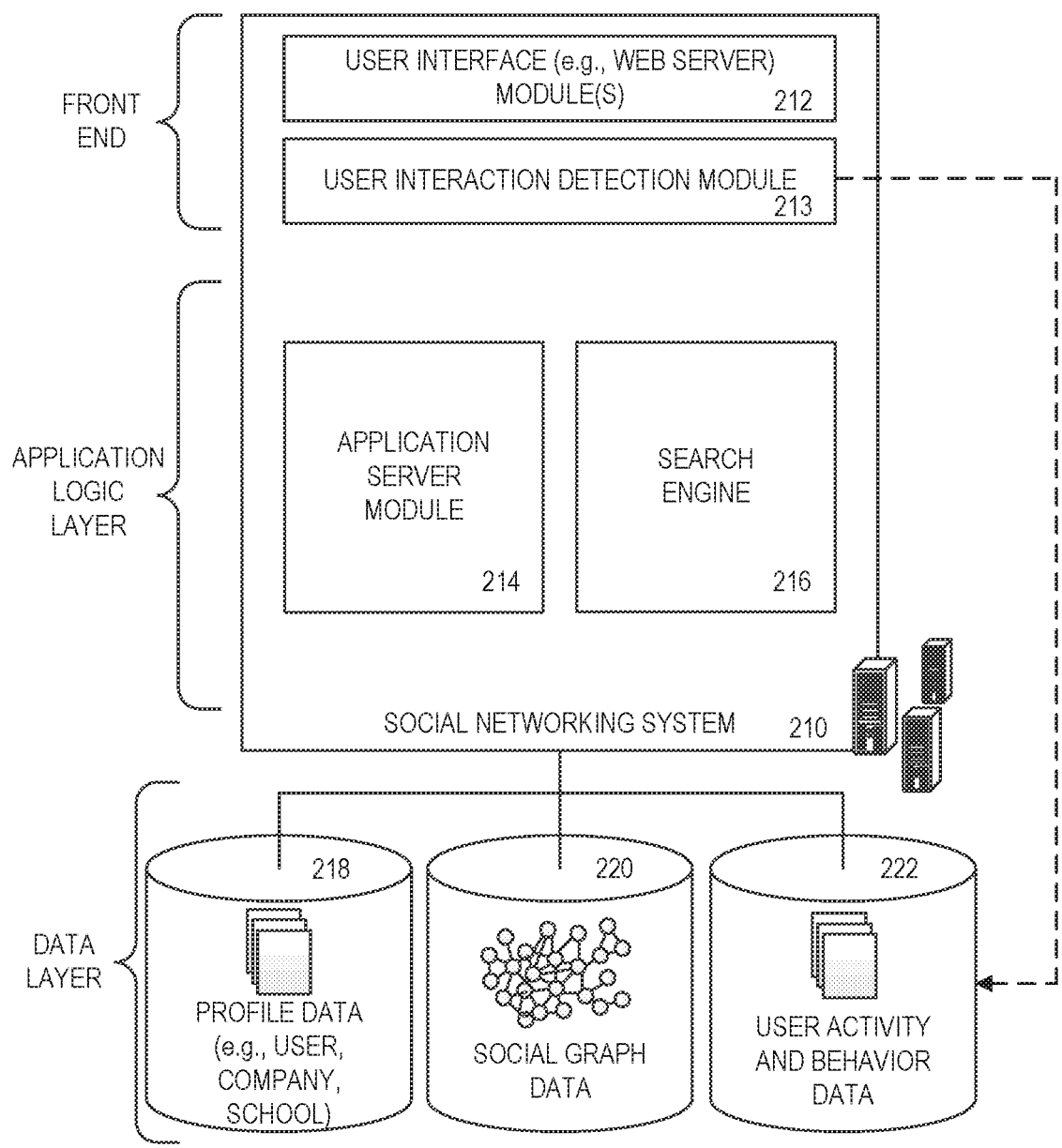
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family users' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, or relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
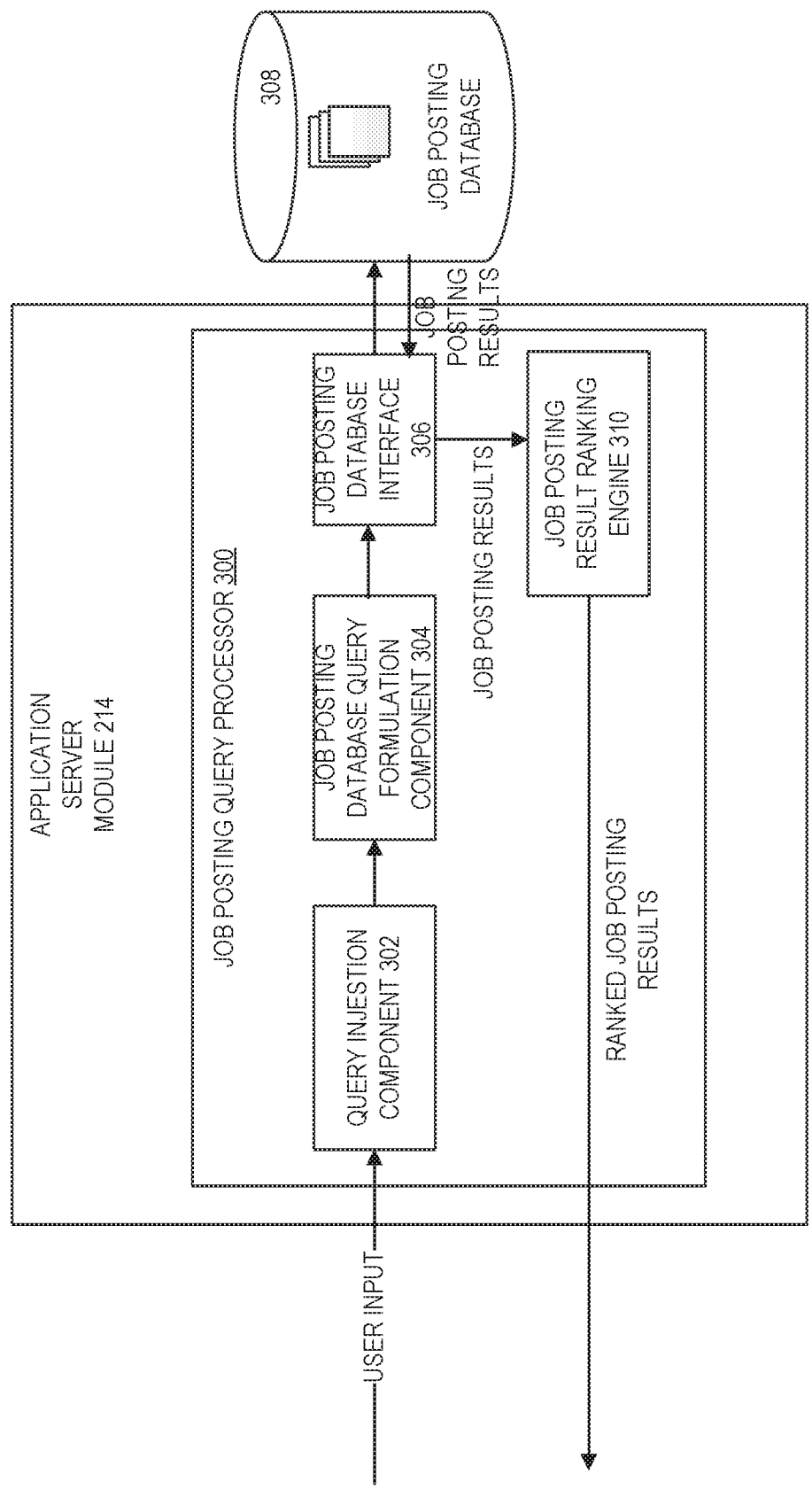
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While, in many embodiments, the application server module 214 will contain many subcomponents used to perform various different actions within the social networking system, in FIG. 3 only those components that are relevant to the present disclosure are depicted. A job posting query processor 300 comprises a query injection component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other users or entities, etc.

This "query" may be sent to a job posting database query formulation component 304, which formulates an actual job posting database query, which will be sent via a job posting database interface 306 to job posting database 308. Job posting results responsive to this job posting database query may then be sent to the job posting result ranking engine 310, again via the job posting database interface 306. The job posting result ranking engine 310 then ranks the job posting results and sends the ranked job posting results back to the user interface for display to the user.

Figure 4:
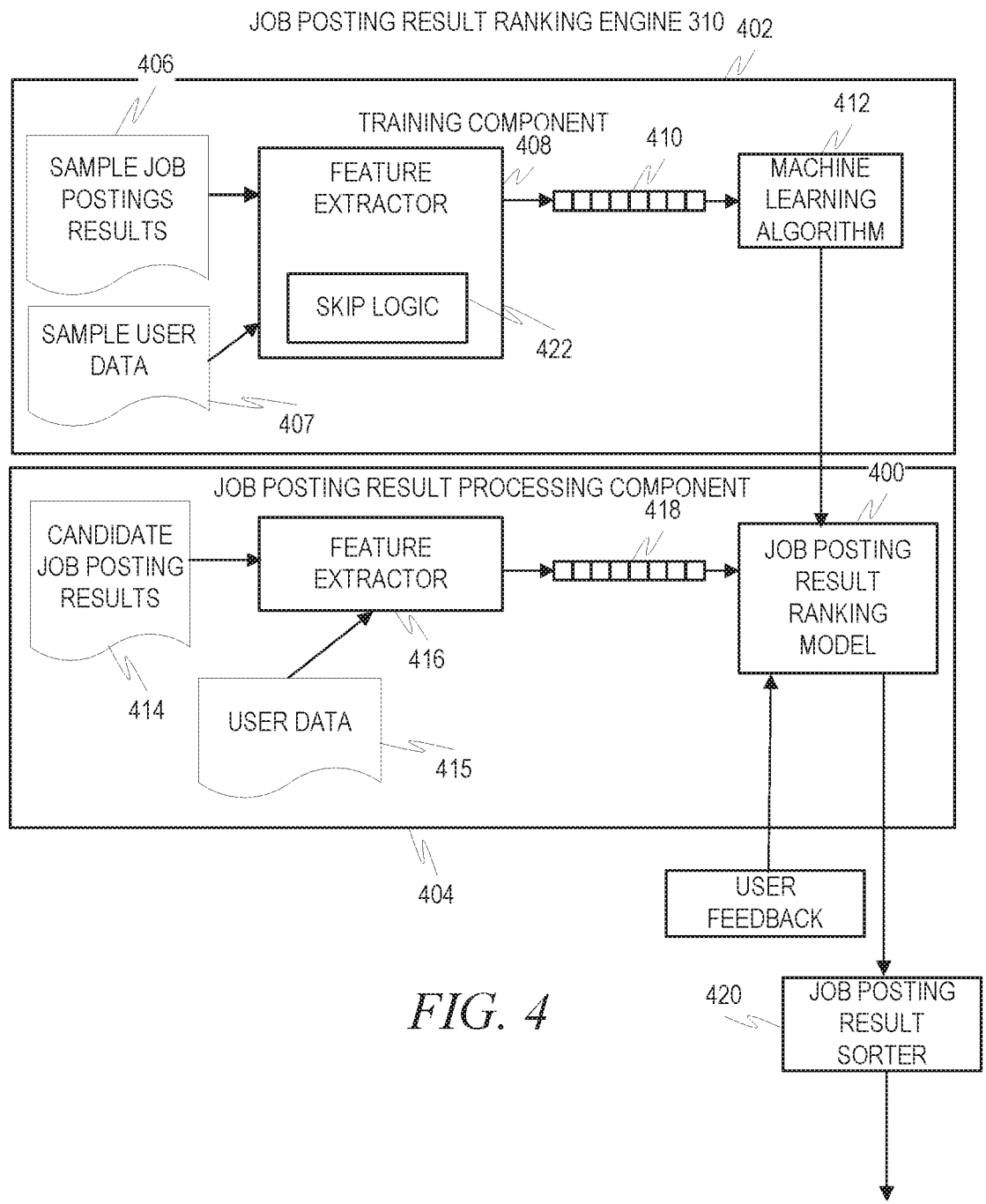
FIG. 4 is a block diagram illustrating a job posting result ranking engine of FIG. 3 in more detail, in accordance with an example embodiment.

FIG. 4 is a block diagram illustrating job posting result ranking engine 310 of FIG. 3 in more detail, in accordance with an example embodiment. The job posting result ranking engine 310 may use machine learning techniques to learn a job posting result ranking model 400, which can then be used to rank actual job posting results from the job posting database 308.

The job posting result ranking engine 310 may comprise a training component 402 and a job posting result processing component 404. The training component 403 feeds sample job postings results 406 and sample user data 407 into a feature extractor 408 that extracts one or more features 410 for the sample job postings results 406 and sample user data 407. The sample job postings results 406 may each include job postings results produced in response to a particular query as well as one or more labels, such as a job posting application likelihood score, which is a score indicating a probability that a user with a corresponding sample user data 407 will apply for the job associated with the corresponding sample job postings result 406.

Sample user data 407 may include, for example, a history of job searches and resulting expressions of interest (such as clicking on job posting results or applications to corresponding jobs) in particular job posting results for particular users. In some example embodiments, sample user data 407 can also include other data relevant for personalization of the query results to the particular user, such as a user profile for the user or a history of other user activity.

A machine learning algorithm 412 produces the job posting result ranking model 400 using the extracted features 410 along with the one or more labels. In the job posting result processing component 404, candidate job postings results 414 resulting from a particular query are fed to a feature extractor 416 along with a candidate user data 415. The feature extractor 416 extracts one or more features 418 from the candidate job postings results 414 and candidate user data 415. These features 418 are then fed to the job posting result ranking model 400, which outputs a job posting application likelihood score for each candidate job postings result for the particular query.

This job posting application likelihood score for each candidate job posting result may then be passed to a job posting result sorter 420, which may sort the candidate job postings results 414 based on their respective job posting application likelihood scores.

It should be noted that the job posting result ranking model 400 may be periodically updated via additional training and/or user feedback. The user feedback may be either feedback from users performing searches, or from companies corresponding to the job postings. The feedback may include an indication about how successful the job posting result ranking model 400 is in predicting user interest in the job posting results presented.

The machine learning algorithm 412 may be selected from among many different potential supervised or unsupervised machine learning algorithms 412. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

Figure 5:
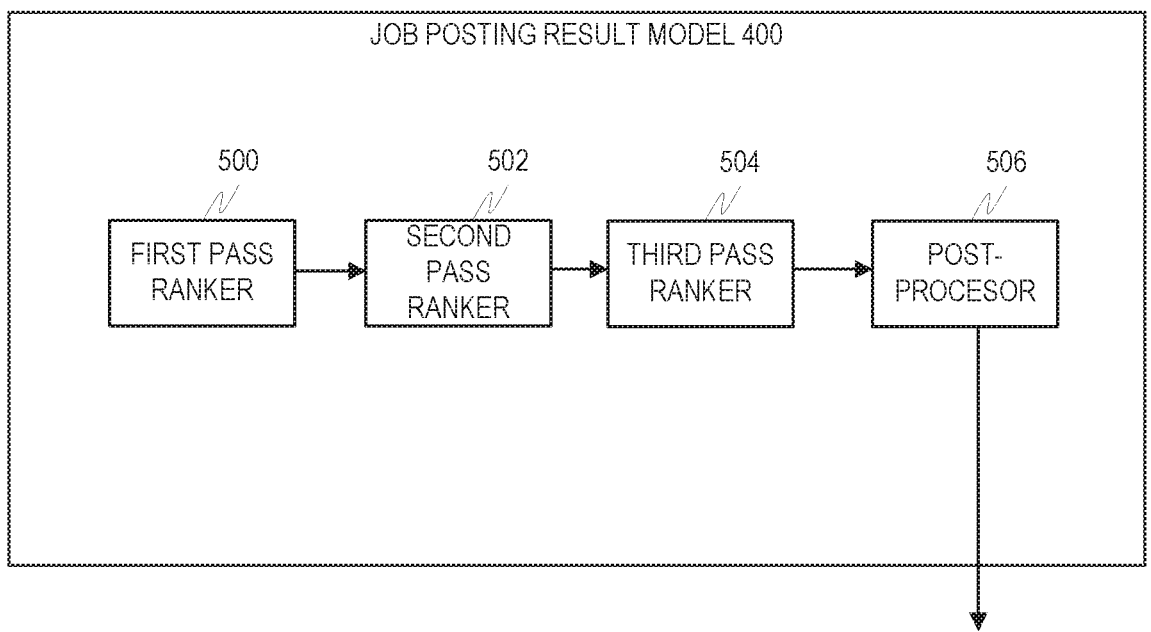
FIG. 5 is a block diagram illustrating a job posting result ranking model 400 in accordance with an example embodiment.

In an example embodiment, the job posting result ranking model 400 actually comprises multiple parts. FIG. 5 is a block diagram illustrating a job posting result ranking model 400 in accordance with an example embodiment. Here, the job posting result ranking model 400 comprises a first pass ranker 500, second pass ranker 502, and third pass ranker 504. The first pass ranker 500 may be, for example, a logistic regression model trained on cosine similarity features. The second pass ranker 502 may be trained on seniority filters and other filters related to jobs the user may be interested in. The third pass ranker 504 may be a model that combines a large number of features, such as thousands of features, using a Generalized Linear Mixed Model (GLMix) or Deep and Wide (D&W) model.

A post-processor 506 may perform various post-processing operations on the search results, including applying boosters such as impression discounting, filters, and randomization to reduce biases.

Figure 6:
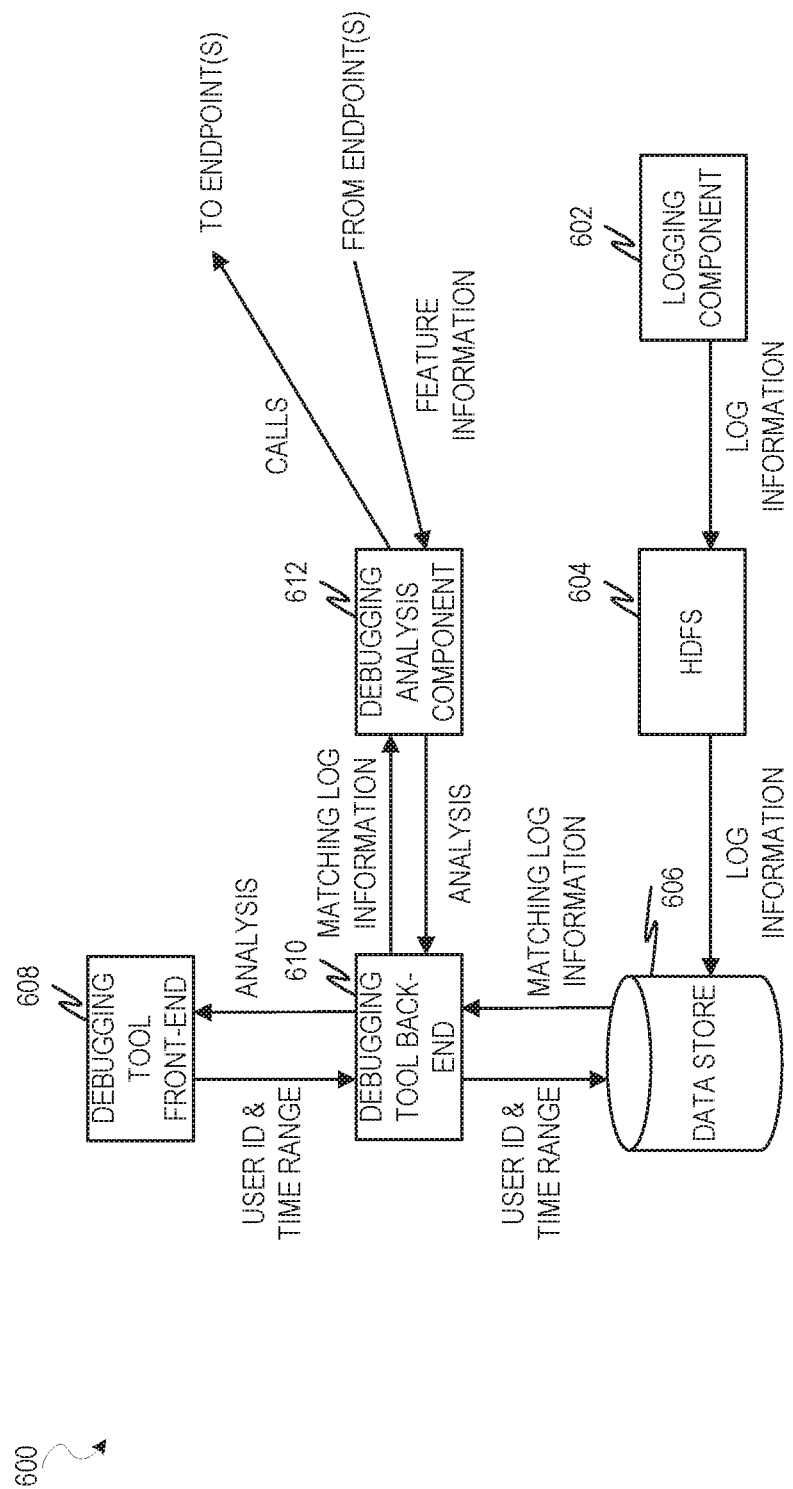
FIG. 6 is a block diagram illustrating a debugging tool system in accordance with an example embodiment.

FIG. 6 is a block diagram illustrating a debugging tool system 600 in accordance with an example embodiment. The debugging tool system 600 includes a logging component 602 that logs information each time a user is served a recommendation from a recommendation system, such as the job posting result ranking model 400 of FIG. 4. As described earlier, this may include an identification of the user, the time/date at which the recommendation was made, an identification of the model that was used to make the recommendation, and an identification of a channel through which the recommendation was made. Channel refers to the area of the user interface that was used to serve the recommendation. For example, in an embodiment where the user interface is performed via a web site or an application (such as a mobile phone "app") that mimic functions of a web site, the channel may refer to, for example, a jobs home page within the web site, or a sponsored Jobs you may be interested in (JYMBII) web page, etc.

The logging component 602 then stores this log information in a distributed file system, such as a Hadoop Distributed File System (HDFS) 604. Periodically, the log information is then pushed from the HDFS 604 to a data store 606. In an example embodiment, the data store may store some of the information in encrypted format, such as using a hashing encryption. This may include, for example, the identification of the user. This provides security and privacy so that if a hacker gains access to the data store 606, he or she will not be able to identify which member the information corresponds to.

In an example embodiment, the information only reflects the information collected over a preset period of time. For example, the information may be only the information collected over the last two weeks. Furthermore, this information may be stored not as a sliding window (where, for example, today's information is added to the data store 606 while the data from 15 days ago is removed from the data store 606), but is instead recalculated each period. Thus, for example, each day, all the information in the data store 606 may be purged and the information collected over the last two weeks may be added. This allows users to have more control over the use of their data, as if a user deletes his or her account, the information for that user will not remain in the database even during the two week period following the deletion.

In an example embodiment, the information in the data store 606 is presorted based on the user identification, then timestamp, then channel. This allows each record to be quickly retrieved using the user identification.

When a developer wishes to perform a debugging task, he or she will interface with a debugging tool front-end 608 by providing the debugging tool front-end 608 with a user identification of a user of interest and a time range that the recommendation that appears to be in error was made. The debugging tool front-end 608 may operate on a personal device of the developer, such as a desktop or laptop computer or mobile device, and may operate as a stand-alone application or as a web page rendered in a browser operating on the user device.

The debugging tool front-end 608 then makes an Application Program Interface (API) call to a debugging tool back-end 610. This API call may include the provided user identification and time range. The debugging tool back-end 610 may operate, for example, on a server separate from the user device. The debugging tool back-end 610 then sends a request including the user identification and time range to the data store 606, receiving back the information in the data store 606 corresponding to the user identification and time range. This information may then be sent to debugging analysis component 612, which performs automatic analysis of how the error in recommendation may occur. This may include retrieving a model corresponding to the model identified in the information, retrieving a user profile and other user-level information corresponding to the user identification, as well as the fabric (i.e., data center) on which the initial recommendation was made, and then replaying the submission of feature information (retrieved from or calculated based on, for example, the user profile and/or other user-level information) to the corresponding model to attempt to reproduce the error.

The debugging analysis component 612 may actually call one or more endpoints, each endpoint acting to obtain different information that can be used by the debugging analysis component. FIG. 7 is a diagram illustrating example endpoints in accordance with an example embodiment.

Results from the debugging analysis component 612 may then be passed to the debugging tool back-end 610, which acts to cause display of these results in the debugging tool front-end 608.

FIGS. 8-11 are screen captures illustrating an example debugging tool front end graphical user interface 800 in accordance with an example embodiment. Referring first to FIG. 8, a developer may enter a member identification in a first field 802, a start date in a second field 804, an end date in a third field 806, and a type of recommendation in a fourth field 808. The debugging tool back-end may then obtain corresponding debugging analysis information as described earlier, and display this debugging analysis information in display area 810. The developer may then modify which debugging analysis information is displayed by selecting an entry in selection box 812. Here, this entry is "Top K", and the information provided in display area 806 pertains to the top K recommendations. For example, the developer is able to see a final score 814, an identification of the job posting 816, and a model score 818, among other information.

Figure 9:
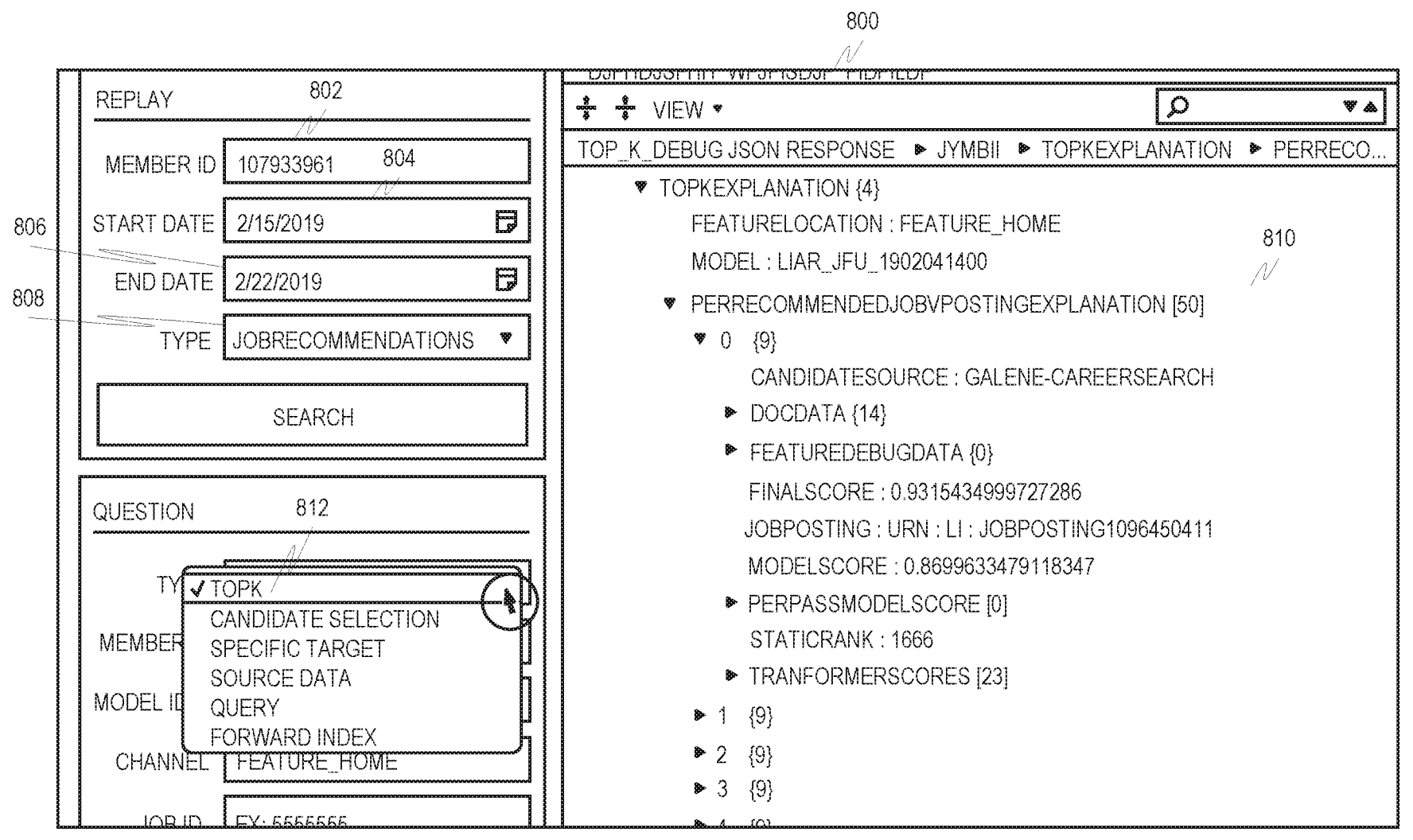

Referring now to FIG. 9, here the user has selected the selection box 808, which displays the entries available, including "Top K," "Candidate Selection," "Specific Target," "Source Data," "Query," and "Forward Index."

Figure 10:
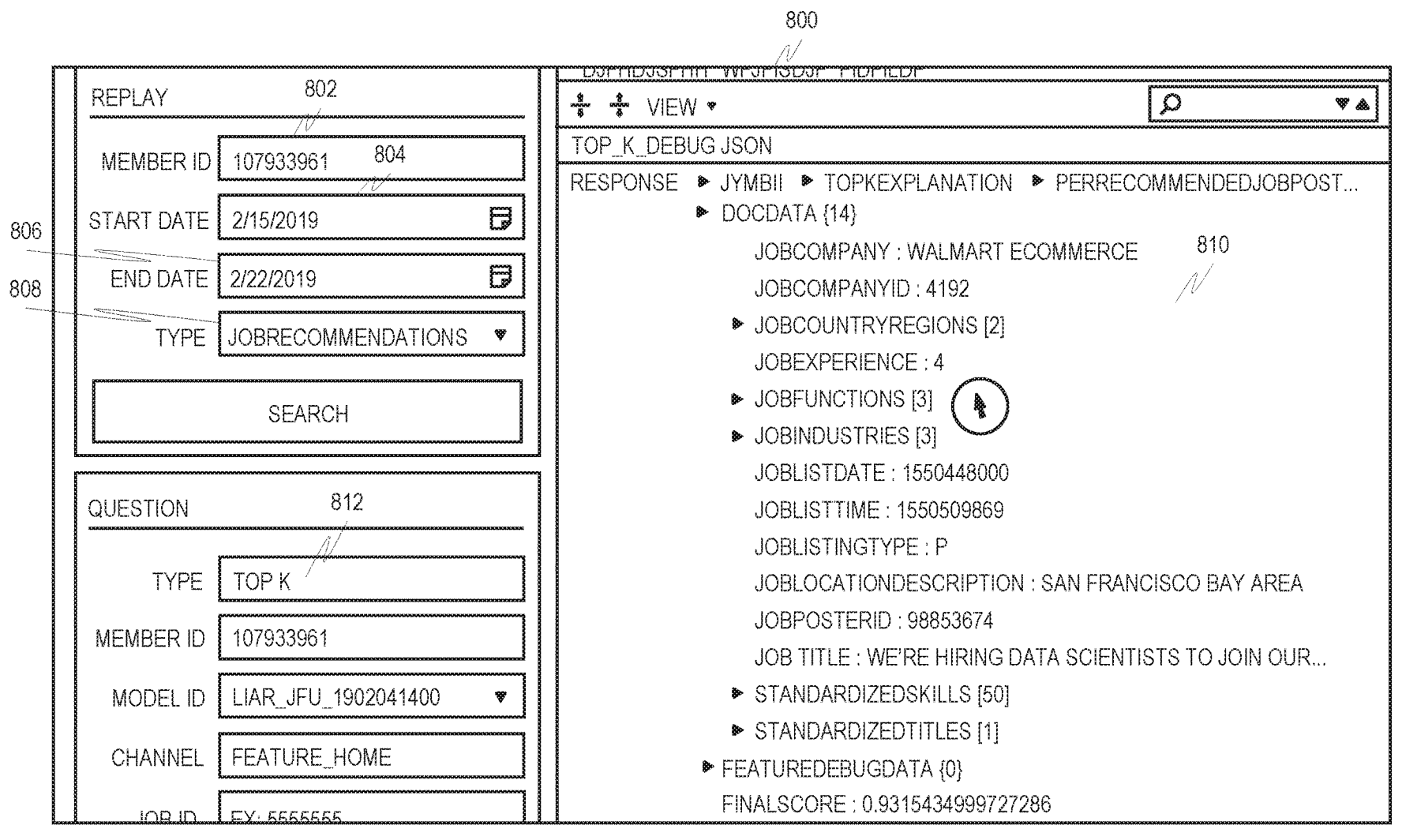

Referring to FIG. 10, here the information displayed in display area 806 includes job-specific information including various job features. The developer is then able to see whether the presence of certain job features caused the erroneous recommendation.

Referring to FIG. 11, it can be seen that skills for the position are listed in the display area 8-6. The developer is able to see, for example, that a particular skill listed for the job posting is incorrect, such as caused by an incorrect standardized skill identification, which may have caused the job posting to have been recommended to a user who has a skill that matches the erroneous skill identification. For example, a job posting for a job at a coffee shop may have listed "Java" as a skill, meaning "Java" in the coffee sense, while the skill was mapped to identification for the Java computer programming language instead of the identification for coffee preparation as a skill.

Figure 12:
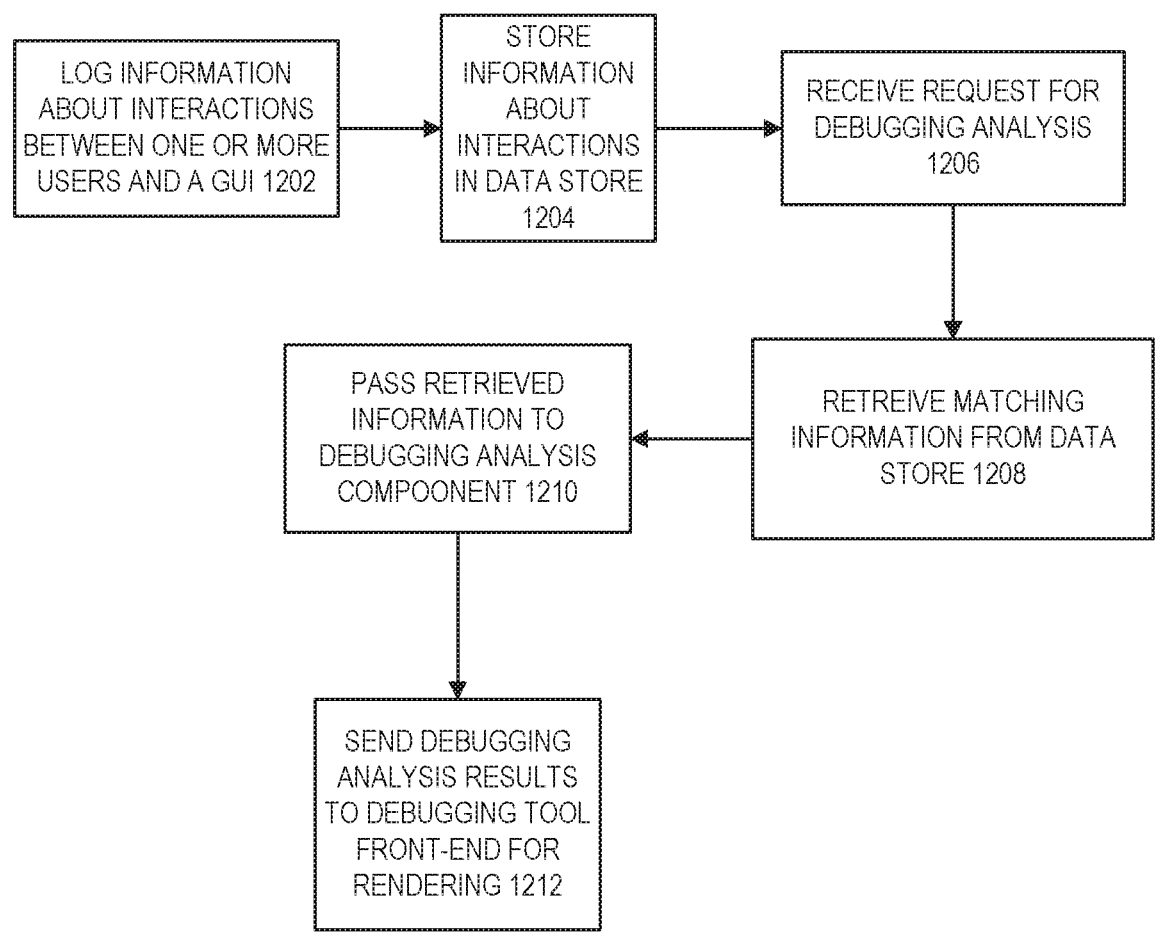
FIG. 12 is a flow diagram illustrating a method to provide debugging analysis of machine learned recommendation models, in accordance with an example embodiment.

FIG. 12 is a flow diagram illustrating a method 1200 to provide debugging analysis of machine learned recommendation models, in accordance with an example embodiment. At operation 1202, information about interactions between one or more users and a graphical user interface is logged. Each interaction involves rendering, within the graphical user interface, a recommended result produced by one or more machine learned recommendation models. The information about interactions includes, for each interaction, an identification of a user to which the recommendation was rendered, an identification of a machine learned recommendation model of the one or more machine learned recommendation models that produced the recommended result, a timestamp indicating when the interaction occurred, and a channel through which the interaction occurred.

At operation 1204, information about interactions is stored in a data store. At operation 1206, a request for debugging analysis is received at a debugging tool back-end, from a debugging tool front-end, the request including a first user identification and a time range. At operation 1208, one or more piece of information about interactions in the data store that match the first user identification and time range is retrieved.

At operation 1210, the retrieved information is passed to a debugging analysis component, the debugging analysis component obtaining feature data using the retrieved information and causing a replay of a recommendation made by a corresponding machine learned recommendation model indicated in the retrieved information using the feature data, producing debugging analysis results. At operation, 1212, the debugging analysis results are sent to the debugging tool front-end for rendering.

Figure 13:
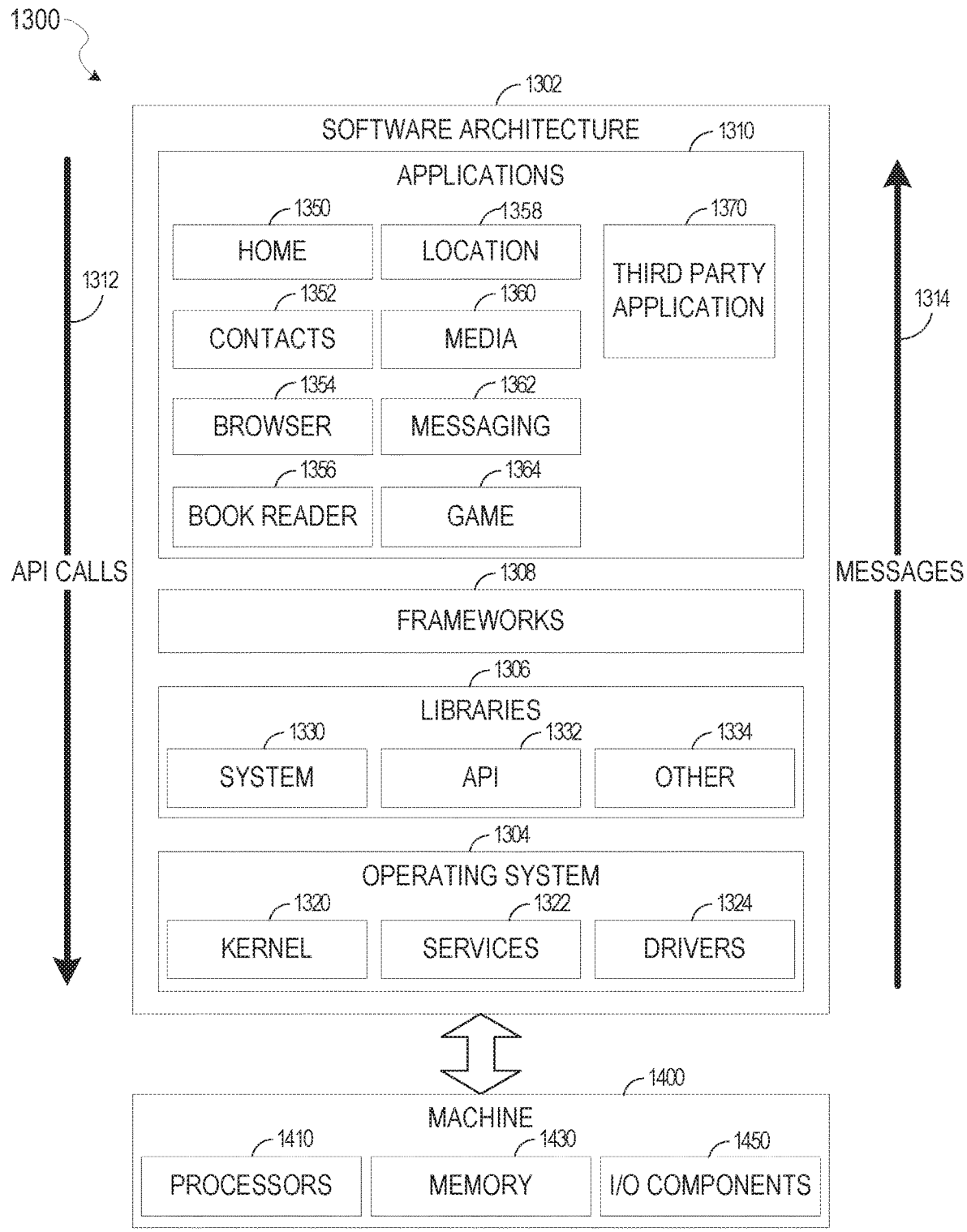
FIG. 13 is a block diagram illustrating a representative software architecture, which may be used in conjunction with various hardware architectures herein described.

FIG. 13 is a block diagram 1300 illustrating a software architecture 1302, which can be installed on any one or more of the devices described above. FIG. 13 is merely a non-limiting example of a software architecture, and it will be appreciated that many other architectures can be implemented to facilitate the functionality described herein. In various embodiments, the software architecture 1302 is implemented by hardware such as a machine 1200 of FIG. 12 that includes processors 1210, memory 1230, and input/output (I/O) components 1250. In this example architecture, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1306 provide a low-level common infrastructure utilized by the applications 1310. The libraries 1306 can include system libraries 1330

(e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various GUI functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1310, an applet, an app, or other executable code) for causing the machine 1400 to perform any one or more of the methodologies discussed herein may be executed. For example, the instructions 1416 may cause the machine 1400 to execute the method 1200 of FIG. 12. Additionally, or alternatively, the instructions 1416 may implement FIGS. 1-12, and so forth. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

Figure 14:
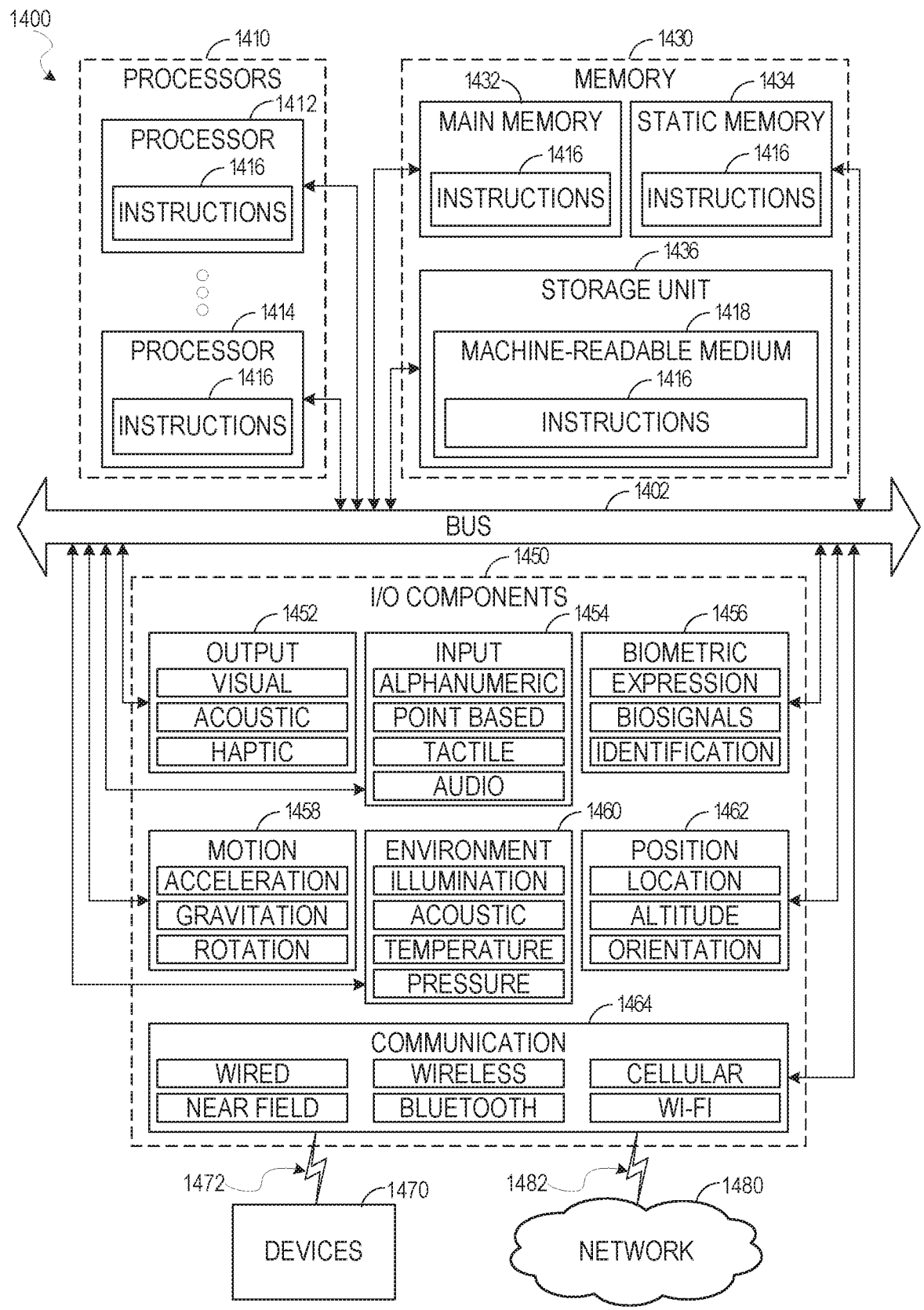
FIG. 14 is a block diagram illustrating components of a machine, according to some example embodiments, able to read instructions from a machine-readable medium (e.g., a machine-readable storage medium) and perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine 1400 will depend on the type of machine 1400. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1430, 1432, 1434, and/or memory of the processor(s) 1410) and/or the storage unit 1436 may store one or more sets of instructions 1416 and data structures (e.g., software) embodying or utilized by any one or more of the methodologies or functions described herein. These instructions (e.g., the instructions 1416), when executed by the processor(s) 1410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1416 and/or data. The terms shall accordingly be taken to include, but not be limited to, solid-state memories, and optical and magnetic media, including memory internal or external to the processors 1410. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a computer-readable medium having instructions stored thereon, which, when executed by a processor, cause the system to:
log information about interactions between one or more users and a graphical user interface, wherein each interaction involves rendering, within the graphical user interface, a recommended result produced by one or more machine learned recommendation models, the information about interactions including, for each interaction, an identification of a user to which the recommendation was rendered, an identification of a machine learned recommendation model of the one or more machine learned recommendation models that produced the recommended result, a timestamp indicating when the interaction occurred, and a channel through which the interaction occurred;
store the information about interactions in a data store;
receive, at a debugging tool back-end, a request for debugging analysis from a debugging tool front-end, the request including a first user identification and a time range;
retrieve one or more piece of information about interactions in the data store that match the first user identification and time range;
pass the retrieved information to a debugging analysis component, the debugging analysis component obtaining feature data using the retrieved information and causing a replay of a recommendation made by a corresponding machine learned recommendation model indicated in the retrieved information using the feature data, producing debugging analysis results: and
send the debugging analysis results to the debugging tool front-end for rendering.

2. The system of claim 1, wherein the debugging analysis component retrieves the corresponding machine learned recommendation model using an identification of the corresponding machine learned recommendation model specified in the retrieved information.

3. The system of claim 1, wherein the storing the information only stores information in the data store that was produced by interactions taking place within a preset amount of time of a current time.

4. The system of claim 3, wherein information about interactions by users who have deleted their account with an online service is not stored in the data store subsequent once their account is deleted.

5. The system of claim 4, wherein the data store is purged on a periodic basis.

6. The system of claim 1, wherein the system is further caused to presort the information in the data store by user identification.

7. The system of claim 1, wherein the one or more machine learned recommendation models are job posting recommendation models.

8. A computerized method, comprising
logging information about interactions between one or more users and a graphical user interface, wherein each interaction involves rendering, within the graphical user interface, a recommended result produced by one or more machine learned recommendation models, the information about interactions including, for each interaction, an identification of a user to which the recommendation was rendered, an identification of a machine learned recommendation model of the one or more machine learned recommendation models that produced the recommended result, a timestamp indicating when the interaction occurred, and a channel through which the interaction occurred;
storing the information about interactions in a data store;
receiving a request for debugging analysis from a debugging tool front-end, the request including a first user identification and a time range;
retrieving one or more piece of information about interactions in the data store that match the first user identification and time range;
obtaining feature data using the retrieved information and causing a replay of a recommendation made by a corresponding machine learned recommendation model indicated in the retrieved information using the feature data, producing debugging analysis results: and
causing rendering of the debugging analysis results.

9. The method of claim 8, wherein retrieving comprises retrieving the corresponding machine learned recommendation model using an identification of the corresponding machine learned recommendation model specified in the retrieved information.

10. The method of claim 8, wherein the storing the information only stores information in the data store that was produced by interactions taking place within a preset amount of time of a current time.

11. The method of claim 10, wherein information about interactions by users who have deleted their account with an online service is not stored in the data store subsequent once their account is deleted.

12. The method of claim 11, wherein the data store is purged on a periodic basis.

13. The method of claim 8, further comprising causing to presort the information in the data store by user identification.

14. The method of claim 8, wherein the one or more machine learned recommendation models are job posting recommendation models.

15. A non-transitory machine-readable storage medium comprising instructions which, when implemented by one or more machines, cause the one or more machines to perform operations comprising:
in a training phase:
logging information about interactions between one or more users and a graphical user interface, wherein each interaction involves rendering, within the graphical user interface, a recommended result produced by one or more machine learned recommendation models, the information about interactions including, for each interaction, an identification of a user to which the recommendation was rendered, an identification of a machine learned recommendation model of the one or more machine learned recommendation models that produced the recommended result, a timestamp indicating when the interaction occurred, and a channel through which the interaction occurred;
storing the information about interactions in a data store;
receiving a request for debugging analysis from a debugging tool front-end, the request including a first user identification and a time range;
retrieving one or more piece of information about interactions in the data store that match the first user identification and time range;
obtaining feature data using the retrieved information and causing a replay of a recommendation made by a corresponding machine learned recommendation model indicated in the retrieved information using the feature data, producing debugging analysis results: and
causing rendering of the debugging analysis results.

16. The non-transitory machine-readable storage medium of claim 15, wherein the retrieving comprises retrieving the corresponding machine learned recommendation model using an identification of the corresponding machine learned recommendation model specified in the retrieved information.

17. The non-transitory machine-readable storage medium of claim 15, wherein the storing the information only stores information in the data store that was produced by interactions taking place within a preset amount of time of a current time.

18. The non-transitory machine-readable storage medium of claim 15, wherein information about interactions by users who have deleted their account with an online service is not stored in the data store subsequent once their account is deleted.

19. The non-transitory machine-readable storage medium of claim 18, wherein the data store is purged on a periodic basis.

20. The non-transitory machine-readable storage medium of claim 15, further comprising causing to presort the information in the data store by user identification.

* * * * *

UNITED STATES PATENT AND TRADEMARK OFFICE
CERTIFICATE OF CORRECTION

| | | |
|---|---|---|
| PATENT NO. | : 11,397,924 B1 | Page 1 of 1 |
| APPLICATION NO. | : 16/366990 | |
| DATED | : July 26, 2022 | |
| INVENTOR(S) | : Moghaddam et al. | |

It is certified that error appears in the above-identified patent and that said Letters Patent is hereby corrected as shown below:

In the Claims

In Column 16, Line 17, in Claim 1, delete "results:" and insert --results;-- therefor In Column 16, Line 41, in Claim 8, after "comprising", insert --:--

In Column 16, Line 66, in Claim 8, delete "results:" and insert --results;-- therefor In Column 18, Line 14, in Claim 15, delete "results:" and insert --results;-- therefor Signed and Sealed this
Eighth Day of November, 2022

*Katherine Kelly Vidal*

Katherine Kelly Vidal
*Director of the United States Patent and Trademark Office*